United States Patent [19]

Woodward

[11] 4,284,882
[45] Aug. 18, 1981

[54] TAMPER RESISTIVE ODOMETER

[75] Inventor: Gary F. Woodward, Ann Arbor, Mich.

[73] Assignee: Ford Motor Company, Dearborn, Mich.

[21] Appl. No.: 64,205

[22] Filed: Aug. 6, 1979

[51] Int. Cl.³ .................... G01C 22/00; G06C 9/00
[52] U.S. Cl. ................................ 235/96; 235/139 R
[58] Field of Search ............... 235/95 R, 96, 139 R, 235/97, 117 R, 1 C

[56] References Cited

U.S. PATENT DOCUMENTS

| 780,490 | 1/1905 | Anderson . | |
|---|---|---|---|
| 1,394,455 | 10/1921 | Veeder . | |
| 1,776,525 | 9/1930 | Talbot . | |
| 2,004,881 | 6/1935 | Slye . | |
| 2,243,738 | 5/1941 | Mather . | |
| 3,137,444 | 6/1964 | Harada | 235/117 R |
| 3,198,430 | 8/1965 | Hermann | 235/95 A |
| 3,482,773 | 12/1969 | Hachtel | 235/95 R |
| 3,495,773 | 2/1970 | Hachtel | 235/96 |
| 3,516,603 | 6/1970 | Hachtel | 235/95 R |
| 3,539,783 | 11/1970 | Bergsma et al. | 235/96 |
| 3,544,002 | 12/1970 | Summerer | 235/96 |
| 3,561,635 | 2/1971 | Henderson | 235/95 R X |
| 3,785,551 | 1/1974 | Regan | 235/95 R |
| 3,801,005 | 4/1974 | Pniewski | 235/95 R |
| 3,949,201 | 4/1976 | Bogart | 235/95 R |
| 3,986,005 | 10/1976 | Itoh | 235/96 |

Primary Examiner—L. T. Hix
Assistant Examiner—Benjamin R. Fuller
Attorney, Agent, or Firm—Paul K. Godwin, Jr.; Clifford L. Sadler

[57] ABSTRACT

A tamper resistive odometer having a construction whereby manual attempt to reverse the number setting thereon, by separating the pinion gear engagement with number wheel gears, results in a fractured pinion gear that permanently disengages all the pinion gears from the number wheel gears.

7 Claims, 3 Drawing Figures

U.S. Patent     Aug. 18, 1981     4,284,882
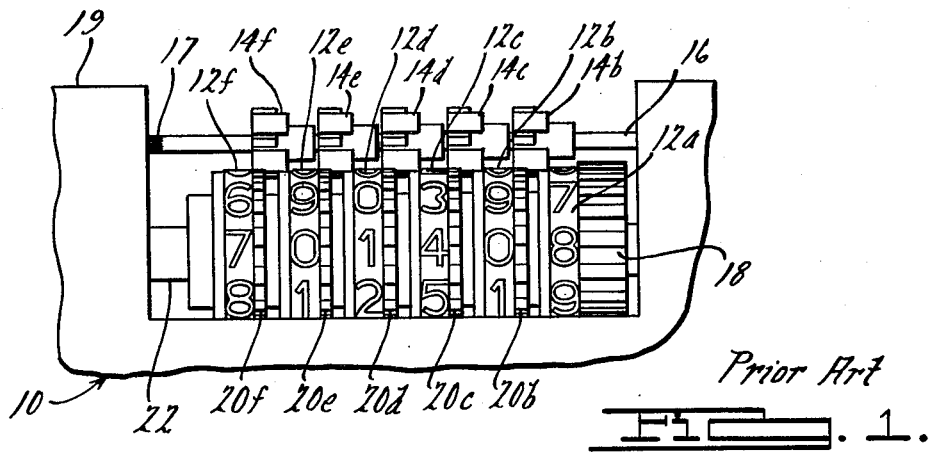
Prior Art
FIG. 1.
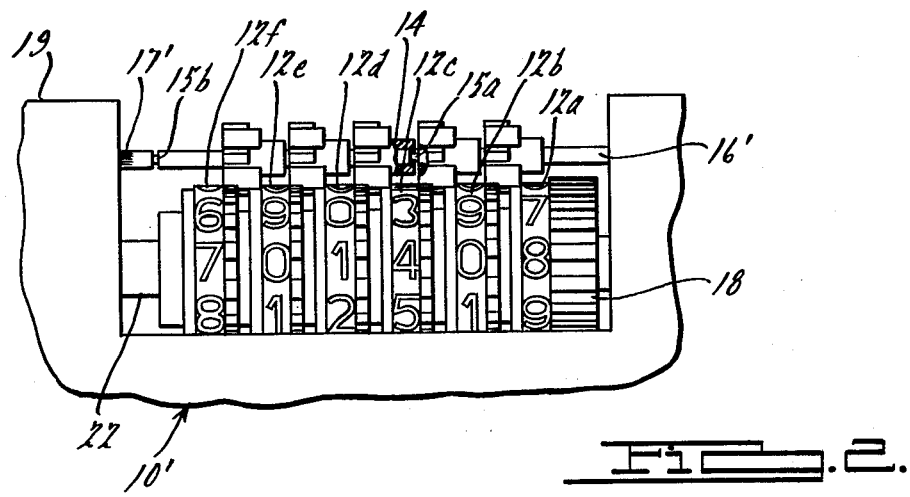
FIG. 2.
FIG. 3.
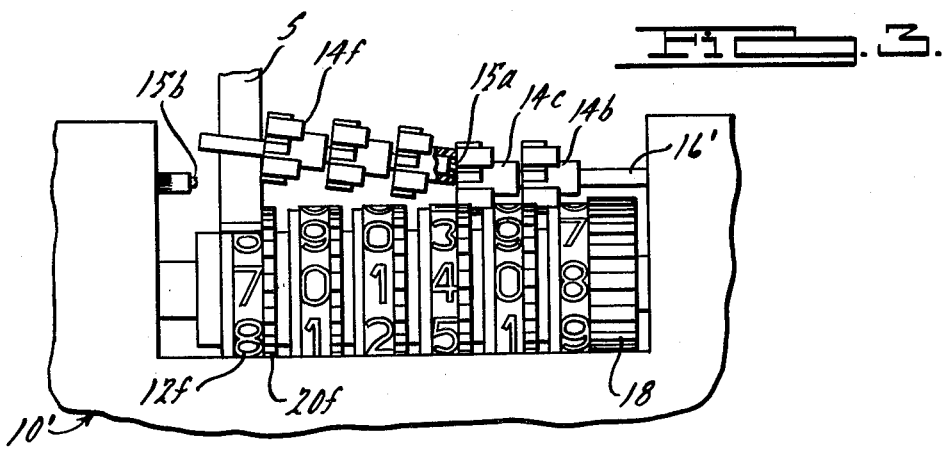

TAMPER RESISTIVE ODOMETER

BACKGROUND OF THE INVENTION

1. Field of the Invention

The present invention relates to the field of distance traveled measuring odometers in general and in particular to that portion of the above noted field which is concerned with odometers that permanently indicate the fact that an odometer has been tampered with in an attempt to manually change the accumulated setting thereon.

2. Description of the Prior Art

In recent times, several attempts have been made to design odometers which are nonreversible or provide a visual indication to indicate that the accumulated value on the odometer has been reversed. In commonly assigned U.S. Pat. No. 3,801,005 (incorporated herein by reference), a particular construction of pinion gears and number wheels is disclosed which insures that if the gearing mechanism of the odometer is reversibly driven, the number wheels will not be lowered in their accumulated display value. However, such an odometer can be tampered with and the reading changed, for example, by using a sharp tool or pick to separate and disengage the number wheels from the pinion gears that are mounted on a somewhat bendable shaft. Upon separation, the number wheel may then be manually turned to a lower setting and thereby indicate a lower mileage on the vehicle than has actually been accumulated thereon.

SUMMARY OF THE INVENTION

The present invention solves the manual tampering problem as set forth above, by providing a brittle pinion shaft that is susceptible to fracture when it is bent sufficiently enough to disengage the pinion gears from engagement with their associated number wheels. The result, upon fracture, is that the pinion gears all permanently disengage with respect to their associated number wheels and the friction between the adjacent number wheels allows them to all turn in unison with the least significant number wheel to give a visual indication to the operator that the odometer has been tampered with.

BRIEF DESCRIPTION OF THE DRAWINGS

FIG. 1 illustrates a prior art odometer which is susceptible to tampering and manual set-back of the number wheels thereon.

FIG. 2 illustrates the present invention as incorporated in a prior art odometer to provide a tamper resistant device.

FIG. 3 illustrates the present invention as it is effected by manual tampering.

DETAILED DESCRIPTION OF THE PREFERRED EMBODIMENT

The prior art odometer illustrated in FIG. 1 closely resembles that shown in U.S. Pat. No. 3,801,005 referred to above. It is intended that the present invention be adaptable to prior art odometers including the type shown in FIG. 1 and be interpreted as an improvement thereto.

As illustrated in FIG. 1, a driven transfer gear 18 is mounted on a shaft 22 along with up-counting number wheels 12a, 12b, 12c, 12d, 12e and 12f. As taught in U.S. Pat. No. 3,801,005 the driven gear 18 is connected for turning the least significant up-counting number wheel 12a in a nonreversible fashion by the use of a drive pin (not shown here) which extends laterally from the drive gear 18. A housing 19 is provided to support the shaft 22 and number wheels in a predetermined location within the vehicle for visual observation. A pinion shaft 16 is mounted in the housing 19 and commonly supports up-counting pinion gears 14b, 14c, 14d, 14e and 14f which are freely mounted for rotation thereon and in engagement with corresponding gears 20b, 20c, 20d, 20e and 20f of respective number wheels 12b, 12c, 12d, 12e and 12f. Generally, the pinion shaft 16 is rigidly mounted at one end in the housing 19 by a force fit in an aperture indicated as 17, while the opposite end is loosely held for linear thermal expansion and contracting.

As briefly indicated in the description of the prior art section, it is possible to insert a pick or other sharp device into the odometer 10 shown in FIG. 1 and thereby separate and disengage the pinion gears from the respective number wheels. For instance, the insertion of a pick or screwdriver above number wheel 12e and under pinion gear 14f bends the shaft 16 upwardly and pinion gear 14f will separate from engagement with the gear teeth 12f of the number wheel 12f. Consequently, it is then possible to manually adjust the most significant number 12f to falsely indicate the correct accumulated mileage of the vehicle on which it is mounted. By removing the pick or screwdriver, the resilient shaft 16 will then bend back to its original position and the pinion gear 14f will then reengage the most significant number wheel gear teeth 20f without any indication that the prior art odometer 10 has been tampered with.

FIG. 2 illustrates the present invention as incorporated in an odometer designated as 10'. In this case, the pinion shaft 16', although mounted the same as that illustrated in FIG. 1 by being force fit into an aperture at 17' and loosely mounted in an aperture at its opposite end, is significantly different from that of the prior art. The significant difference is that the pinion shaft 16' is manufactured of a brittle material such as full hard 440 stainless steel. This shaft 16' is designed to fail when transverse shear forces are applied thereto which would tend to separate any of the pinion gears from their respective number wheel gears. In FIG. 3, one can see the result of a tampering attempt, whereby the pinion gear 16' fractures upon the application of shear forces thereto.

Referring again to FIG. 2, the pinion shaft 16' of the present invention contains two high stress areas 15a and 15b which are reduced cross-sectional areas formed into the shaft to provide high susceptibility to excessive shear forces. These high stress areas provide the predictable fracturing characteristics that are necessary for this type of device.

As shown in FIG. 3, a screwdriver designated "S" is shown being inserted between the pinion shaft 16' and number wheel 12f. In an attempt to bend the pinion shaft 16' a sufficient amount to separate the pinion gear 14f from its engagement with gear 20f on number wheel 12f, the shaft fractures at both high stress areas 15a and 15b. As a result, the section of shaft 16' between the fractured areas 15a and 15b falls away from engagement with the number wheels and, due to the loose fit of the remainder of pinion gear 16', the remaining pinion gears 14b and 14c also fall away. Due to the frictional mounting between the number wheels, they will then all turn in unison along with the least significant number wheel. Such turning of all of the number wheels presents an immediate and recognizable indication to the vehicle operator that the odometer is faulty and has been tampered with.

It will be apparent that many modifications and variations may be effected without departing from the scope of the novel concept of this invention. Therefore, it is intended by the appended claims to cover all such modifications and variations which fall into the true spirit and scope of the invention.

I claim:

1. In a multi-wheel type odometer utilizing an up-counting pinion gear between each pair of adjacent wheels and engaged with at least one of said wheels freely mounted on a common pinion shaft, an improvement comprising:
   a brittle pinion shaft rigidly mounted so as to fracture in the event attempts are made to disengage any up-counting pinion gear from its associated wheel.

2. The improvement as in claim 1, wherein said brittle pinion shaft contains at least two areas along its length having reduced cross-sections sensitive to transverse shear forces.

3. An improvement as in claims 1 or 2 wherein said brittle pinion shaft is formed from full hard 440 stainless steel.

4. A tamper resistive odometer having characteristics which cause the odometer to indicate that the highest accumulated mileage indication thereon has been tampered with, comprising:
   a housing providing rigid support to said odometer;
   a pinion shaft secured to said housing;
   a plurality of pinion gears freely and commonly mounted on said pinion shaft;
   a number wheel shaft in said housing;
   a plurality of pinion driven number wheels mounted on said wheel shaft, each of said number wheels containing gear teeth and each number wheel engaging a corresponding pinion by said gear teeth;
   said pinion shaft being formed of a brittle material being susceptible to fracture when said shaft is bent to a point whereby any pinion gear is forced from engagement with the gear teeth of its corresponding number wheel.

5. An odometer as in claim 4, wherein said pinion shaft contains at least two areas of reduced cross-section, as compared to the remainder of said shaft, defining high stress/fracture areas.

6. An odometer as in claims 4 or 5, wherein said number wheels are mounted on said wheel shaft so as to be touching respectively adjacent wheels and said wheels turn in unison when said pinion shaft is fractured, thereby presenting a recognizable indication of odometer tampering.

7. An odometer as in claim 6, further including a driven transfer gear mounted on said number wheel shaft and a least significant number wheel mounted betwen said transfer gear and said pinion engaged number wheels whereby said transfer gear is engaged with and drives said least significant number wheel in one direction.

* * * * *